US00RE44191E

(19) United States
(12) Reissued Patent
Hussmann

(10) Patent Number: US RE44,191 E
(45) Date of Reissued Patent: Apr. 30, 2013

(54) ELECTRIC DEVICE, COMPUTER PROGRAM, SYSTEM AND METHOD OF SETTING UP USER APPLICATIONS

(75) Inventor: Holger Hussmann, Tampere (FI)

(73) Assignee: Amosmet Investments LLC, Dover, DE (US)

(21) Appl. No.: 12/788,218

(22) Filed: May 26, 2010
(Under 37 CFR 1.47)

Related U.S. Patent Documents

Reissue of:
(64) Patent No.: 7,379,975
Issued: May 27, 2008
Appl. No.: 10/825,929
Filed: Apr. 16, 2004

(51) Int. Cl.
*G06F 15/16* (2006.01)

(52) U.S. Cl.
USPC ..... 709/217; 709/203; 709/204; 709/227; 709/248

(58) Field of Classification Search ..... 709/203, 709/204, 217, 227, 248, 202, 220, 230
See application file for complete search history.

(56) References Cited

U.S. PATENT DOCUMENTS

| | | | | |
|---|---|---|---|---|
| 5,068,916 | A * | 11/1991 | Harrison et al. | 455/39 |
| 5,586,261 | A * | 12/1996 | Brooks et al. | 709/238 |
| 6,397,186 | B1 * | 5/2002 | Bush et al. | 704/274 |
| 6,460,051 | B1 * | 10/2002 | LaRue et al. | 1/1 |
| 6,519,464 | B1 * | 2/2003 | Santhoff et al. | 455/456.5 |
| 6,615,276 | B1 * | 9/2003 | Mastrianni et al. | 709/250 |
| 6,934,756 | B2 * | 8/2005 | Maes | 709/227 |
| 6,985,966 | B1 * | 1/2006 | Gupta et al. | 709/248 |
| 7,003,288 | B2 * | 2/2006 | Ueda et al. | 455/418 |
| 7,043,572 | B2 | 5/2006 | Shapiro et al. | |
| 7,089,307 | B2 * | 8/2006 | Zintel et al. | 709/224 |
| 7,222,160 | B2 | 5/2007 | Hlasny | |
| 7,756,106 | B2 * | 7/2010 | Nakao et al. | 370/352 |
| 2002/0065926 | A1 * | 5/2002 | Hackney et al. | 709/231 |
| 2002/0090911 | A1 | 7/2002 | Evans et al. | |

(Continued)

FOREIGN PATENT DOCUMENTS

| | | |
|---|---|---|
| DE | 100 38 142 A 1 | 2/2001 |
| DE | 10038142 A1 | 2/2001 |

(Continued)

OTHER PUBLICATIONS

STIC-EIC2100, Litigation Search, Mar. 15, 2012, 10 pages.*

(Continued)

*Primary Examiner* — Michael Won
(74) *Attorney, Agent, or Firm* — Knobbe, Martens, Olson & Bear, LLP

(57) ABSTRACT

A method, a system, electric devices applying the method, and computer programs implementing the method are provided. According to the invention, a second set of information is communicated between electric devices over a wireless proximity interface, the second set of information being associated with a second user application of the second electric device. A correspondence indicator value characterizing the readiness of a first electric device and the second electric device to execute at least one command associated with a first user application and the second user application is evaluated on the basis of a first set of information and the second set of information, wherein the first set of information is associated with a first user application of the first electric device. On the basis of the correspondence indicator value, a decision is made whether to execute the at least one command.

68 Claims, 4 Drawing Sheets

U.S. PATENT DOCUMENTS

| | | | | |
|---|---|---|---|---|
| 2003/0001882 | A1 | 1/2003 | Macer et al. | |
| 2003/0014759 | A1 | 1/2003 | Van Stam | |
| 2005/0204014 | A1 | 9/2005 | Yao et al. | |
| 2006/0068703 | A1* | 3/2006 | Ng et al. | 455/41.2 |
| 2006/0223556 | A1* | 10/2006 | Xu et al. | 455/502 |
| 2009/0164667 | A1* | 6/2009 | Zhang et al. | 709/248 |
| 2009/0282169 | A1* | 11/2009 | Kumar et al. | 709/248 |
| 2009/0318168 | A1* | 12/2009 | Khosravy et al. | 455/456.3 |
| 2009/0327449 | A1* | 12/2009 | Silverman et al. | 709/217 |
| 2010/0042684 | A1* | 2/2010 | Broms et al. | 709/204 |
| 2010/0063670 | A1* | 3/2010 | Brzezinski et al. | 701/33 |

FOREIGN PATENT DOCUMENTS

| | | | |
|---|---|---|---|
| EP | 1 086 732 | A1 | 3/2001 |
| EP | 1086732 | A1 | 3/2001 |
| JP | 2005006766 | | 1/2005 |

OTHER PUBLICATIONS

International Search Report from PCT/FI2005/000185, dated Jun. 7, 2005.

* cited by examiner

ELECTRIC DEVICE, COMPUTER PROGRAM, SYSTEM AND METHOD OF SETTING UP USER APPLICATIONS

Matter enclosed in heavy brackets [ ] appears in the original patent but forms no part of this reissue specification; matter printed in italics indicates the additions made by reissue.

FIELD

The invention relates to a method of setting up a user application in a plurality of electric devices, to electric devices, to a system, and to computer programs for executing a computer process in an electric device.

BACKGROUND

Some user applications of electric devices involve application data, which are shared between at least two electric devices and communicated from one electric device to another over a wireless interface.

The electric devices may detect the presence of each other based on a wireless proximity interface, such as those based on Bluetooth communication, on which at least a portion of a wireless communication may be based.

However, the complexity related to setting up user applications may give rise to situations where the application set up requires complex actions from the users of the electric devices. Such a complexity may be due to, for example, the number of user applications in an electric device, the characteristics of user applications and the user preferences associated with the user applications.

Therefore, it is useful to consider improvements in setting up applications involving shared application data.

BRIEF DESCRIPTION OF THE INVENTION

An object of the invention is to provide an improved method, electric device and computer program in order to simplify the application set up of user applications which share application data. According to a first aspect of the invention, there is provided a method of setting up user applications in a plurality of electric devices, the method including: communicating at least a portion of a second set of information from a second electric device to a first electric device over a wireless proximity interface, the second set of information being associated with a second user application of the second electric device; evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding, on the basis of the correspondence indicator value, whether to execute the at least one command.

According to a second aspect of the invention, there is provided an electric device including: an application unit for executing commands associated with a first user application of the electric device, the first user application using shared application data communicated between the electric device and another electric device by using a wireless interface, the application data being shared with a second user application of the other electric device; a proximity communication unit for providing a proximity interface between the electric device and the other electric device; an application information register connected to the application unit, for storing a first set of information, the first set of information being associated with the first user application; wherein the proximity communication unit is configured to receive at least a portion of a second set of information from the other electric device over the wireless proximity interface, the second set of information being associated with the second user application; a correspondence evaluating unit connected to the proximity communication unit and the application information register, for evaluating a correspondence indicator value on the basis of at least a portion of the first set of information and the at least a portion of the second set of information, the correspondence indicator value characterizing the readiness of the electric device and the other electric device to execute at least one command associated with the first user application and the second user application; and a decision unit connected to the correspondence evaluating unit, for deciding, on the basis of the correspondence indicator value, whether to execute the at least one command.

According to a third aspect of the invention, there is provided an electric device including: an application unit for executing commands associated with a second user application of the electric device, the second user application using shared application data communicated between the electric device and another electric device by using a wireless interface, the application data being shared with a first user application of the other electric device; a proximity communication unit for providing a proximity interface between the electric device and the other electric device; an application information register connected to the application unit, for storing at least a portion of a second set of information, the second set of information being associated with the second user application, the at least a portion of the second set of information being used to evaluate a correspondence indicator value characterizing the readiness of the electric device and the electric device to execute at least one command associated with the first user application and the second user application; wherein the proximity communication unit is connected to the application information register and configured to transmit the at least a portion of the second set of information to the other electric device over the wireless proximity interface; wherein the proximity communication unit is connected to the application unit and configured to receive instructions to execute at least one command from the other electric device over the proximity interface, the at least one command being associated with the second user application; and wherein the application unit is configured to execute the at least one command on the basis of the instructions.

According to a fourth aspect of the invention, there is provided a computer program embodied on a computer readable medium, for executing a computer process in an electric device, the computer process including steps, the steps including: using, as input, at least a portion of a second set of information communicated from a second electric device to a first electric device over a wireless proximity interface, the second set of information being associated with a second user application of the second electric device; evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding, on the basis of the correspondence indicator value, whether to execute the at least one command.

According to a fifth aspect of the invention, there is provided a computer program embodied on a computer readable medium, for executing a computer process in an electric device, the computer process including steps, the steps including: inputting instructions to execute at least one command from the other electric device over the proximity interface, the at least one command being associated with the second user application, the second user application using application data shared between the electric device and another electric device, at least a portion of the application data being communicated between the first electric device and the second electric device by using a wireless interface; and executing the at least one command on the basis of the instructions.

According to yet another aspect of the invention, there is provided a system including a first electric device and a second electric device, the system further including: communicating means for communicating at least a portion of a second set of information from the second electric device to the first electric device over a wireless proximity interface, the second set of information being associated with a second user application of the second electric device; evaluating means for evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding means for deciding, on the basis of the correspondence indicator value, whether to execute the at least one command.

Preferred embodiments of the invention are described in the dependent claims.

The method, system, electric devices and computer programs of the invention provide several advantages. In a preferred embodiment of the invention, a correspondence indicator value is evaluated, which characterizes the readiness of electric devices capable of using shared application data to participate in an interactive operation of the user applications. The evaluation of the correspondence indicator value replaces some application set up actions, such as navigation through a menu structure of the electric device, otherwise being required from the user. As a result, the application set up is simplified.

LIST OF DRAWINGS

In the following, the invention will be described in greater detail with reference to the preferred embodiments and the accompanying drawings, in which FIG. 1 shows a first example of a system of electric devices;

DESCRIPTION OF EMBODIMENTS

Figure 1:
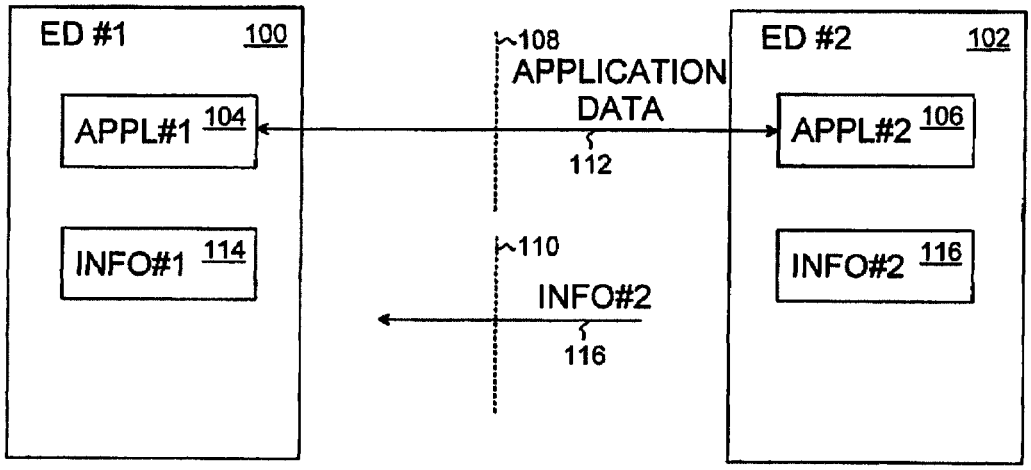

With reference to FIG. 1, in an aspect, a system includes an electric device (ED#1) 100, also referred to as "a first electric device". The electric device 100 is associated with another electric device (ED#2) 102, also referred to as "a second electric device".

In another aspect of the invention, the system includes an electric device 102, also referred to as "a second electric device". The electric device 102 is associated with another electric device 100, also referred to as "a first electric device".

The first electric device 100 and the second electric device 102 include a first user application (APPL#1) 104 and a second user application (APPL#2) 106, respectively. The first user application 104 and the second user application 106 use shared application data 112, which are communicated between the first electric device 100 and the second electric device 102 by using a wireless interface 108.

For the ease of discussion, let a common term "a user application" represent the first user application 104 and/or the second user application 106. Furthermore, let a common term "a set of information" represent a first set of information 114 and/or a second set of information 116. In addition, let a term "electric device" represent the first electric device 100 and the second electric device 102. The use of the common terms is justified on the basis of common features included in the first electric device 100 and the second electric device 102. However, features specifically related to the first electric device 100 and the second electric device 102, respectively, are indicated with the attributes "the first" and "the second".

The electric device 100, 102 may be a handheld gaming console. The electric device 100, 102 may further include a mobile phone radio modem, thus enabling the electric device 100, 102 to connect to a telecommunications infrastructure. In such a case, the electric devices 100, 102 may both be connected to a network infrastructure of a wireless telecommunications system through which the application data 112 is communicated between the first electric device 100 and the second electric device 102. The wireless telecommunications system may include a GSM (Global System for Mobile telecommunications) and/or a UMTS (Universal Mobile Telecommunications System), for example.

The electric device 100, 102 may further be comprise a personal computer, a video game console, a television set, or a digital adapter connected to a television set and a broadcast system.

It should be noted that the first electric device 100 and the second electric device 102 may have different characteristics. For example, the first electric device 100 may be a portable electric device equipped with a mobile phone radio modem while the second electric device 102 is a permanently mounted type device, such as a television set, a digital adapter or a video game console.

In an embodiment of the invention, the first user application 104 and the second user application 106 are game applications. In such a case, the application data 112 deliver, for example, the necessary control information and commands from one electric device to another in order to enable interactive operation between the game applications.

In an embodiment of the invention, the first user application 104 and the second user application *106* are communication applications, which enable the first electric device 100 and the second electric device 102 to exchange data. The communication applications typically implement communication protocols and may be used, for example, to exchange files, such as electric business cards, graphics files, audio files and/or text files between the first electric device 100 and the second electric device 102.

The first user application 104 and the second user application 106 are associated with a first set of information (INFO#1) 114 and a second set of information (INFO#2) 116, respectively. At least one portion of the first set of information 114 is generated in the first electric device 100. At least one portion of the second set of information 116 is generated in the second electric device 102.

At least one portion of the second set of information 116 is communicated from the second electric device 102 to the first electric 100 device over a wireless proximity interface 110.

The wireless proximity [wireless] interface 110 provides a short-range wireless telecommunications link between the first electric device 100 and the second electric device 102. The range of the proximity wireless interface 110 may vary, for example, from centimeters to dozens of meters. The range is not, however, restricted to this example.

The *wireless* proximity [wireless] interface 110 may be based on radio frequency communication, such as a Bluetooth technology. Embodiments may exist which utilize RFID (Radio Frequency Identification) technology. An average skilled person is familiar with the aforementioned wireless proximity technologies, and therefore, the technologies are described only briefly.

In an embodiment of the invention, the wireless interface 108 is a wireless proximity interface. In such a case, the application data 112 and the at least one portion of the second set of information 116 may be communicated over a shared wireless proximity interface 110.

In the first electric device 100, a correspondence indicator value is evaluated on the basis of at least one portion of a first set of information 114 and the at least one portion of the second set of information 116. The correspondence indicator value typically characterizes the readiness of the first electric device 100 and the second electric device 102 to execute at least one command associated with the first user application 104 and the second user application 106.

On the basis of the correspondence indicator value, a decision is made whether or not to execute the at least one command. If the correspondence indicator value indicates that the readiness of the electric devices 102, 104 is sufficiently high, the at least one command may be executed. If the correspondence value indicates that the readiness of the electric devices is not sufficiently high, the at least one command is not executed.

The at least one command associated with the first user application 104 and the second user application 106 is typically a command which gives rise to interactive actions in the first user application 104 and the second user application 106. An interactive action is typically an action performed by a computer and involves and/or is followed by communication of the application data 112. The at least one command may be associated with a series of commands, which are executed automatically by the operating system and/or by the user application 104, 106 and which correspond to the most probable actions performed by the user. As a result, the at least one command is used to replace a series of actions of the user, and so the usage of the user application 104, 106 is simplified. For example, navigation steps through a complex user interface menu structure may be replaced with the at least one command.

In an embodiment of the invention, the at least one command is a start command to start the first user application 104 and the second user application 106. The start command may be generated in the first electric device 100 and delivered to the second electric device 104, embedded in the application data 112, or transmitted over the wireless proximity interface 110. In an embodiment of the invention, the at least one command starts a game application.

In an embodiment of the invention, the at least one command starts the communication of the application data 112. In such a case, the first user application 104 and the second user application 106 may be running at the moment the command is executed.

In an embodiment of the invention, the at least one command sets the user application 104, 106 and/or the operating systems of the electric device 100, 102 such that the user application 104, 106 is in a standby state. In a standby state, the user application 104, 106 is ready to be started. The standby state may be indicated to the user of the electric device 104, 106. The user application 104, 106 may be started based on a command generated by the user.

The set of information 114, 116 is associated with the user application 104, 106. The set of information 114, 116 may include user application information, such as identification information and application data format information. The user application information typically describes the technical characteristics of the user application 104, 106, thus making it possible to evaluate whether the first user application 104 and the second user application 106 fulfill the technical requirements needed for an interactive operation. In such a case the correspondence indicator may characterize the readiness of the first electric device 100 and the second electric device 102 to execute commands associated with the first user application and the second user application from the point of view of the technical characteristics of the first user application 104 and the second user application 106.

In an embodiment of the invention, the set of information 114, 116 may further include usage information relating to the user application 104, 106. The usage information may include user preferences and usage history of the user application 104, 106.

The user preferences may include user settings relating to the user application and/or the operating system in which the user application operates. A user preference may be, for example, a degree of difficulty setting of a game application. The user preference may include a user setting, which enables or disables the user application to be executed in an interactive mode. In an interactive mode, the application data are being shared between the first electric device 100 and the second electric device 102. In such a case, the correspondence indicator value characterizes the match between the user preferences related to the first user application 104 and the second user application 106. The better the match between the first user application 104 and the second user application 106, the higher the correspondence indicator value and the readiness of the first electric device 100 and the second 102 electric device to execute the at least one command associated with the first user application 104 and the second user application 106.

The usage history of the user application may include, for example, a participation rate at which the electric device 100, 102 has executed the user application 104, 106 in an interactive mode. The participation rate characterizes the probability of the user of the user application 104, 106 to be willing to participate in the interactive action. The higher participation rate for both the first user application 104 and the second user application 106, the higher the correspondence indicator value and thus the readiness of the first electric device 100 and the second 102 electric device to execute the at least one command associated with the first user application 104 and the second user application 106.

In an embodiment of the invention, the set of information 114, 116 includes a readiness parameter, which characterizes the user's readiness to use the user application 104, 106.

In an embodiment of the invention, the readiness parameter includes information on the selected menu item shown to the user. The selected menu item is typically a graphical indicator, which indicates to the user a selection item in a selection tree structure. In such a way, the readiness parameter indicates the user's possible preparedness to use the user application 104, 106.

The selected menu item may relate to the user application 104, 106 and/or to the operating system of the electric device 100, 102. When included in the second set of information 116, for example, the readiness parameter informs the first electric device 100 that the second electric device 102 is willing to participate in an interactive session where the application data 112 are shared. If the first set of information 114 indicates the readiness of the first electric device 102 to participate an interactive session, the correspondence indicator value increases, which results in a higher probability of executing the at least one command. Finally, the at least one command may lead to an automatic configuration of the applications 104, 106 to participate in the interactive session.

In an embodiment of the invention, the readiness parameter includes action information on the actions performed and/or being performed by the electric device 100, 102. The action information may characterize the current and/or previous actions performed by the user, thus indicating the activity of the user.

The action information may include information on the current and/or previous actions, and possibly time information on the actions. Such actions may be, for example, navigation actions in the user menu structure, actions associated with accepting and/or initiating calls, and/or actions associated with user applications.

Figure 2:
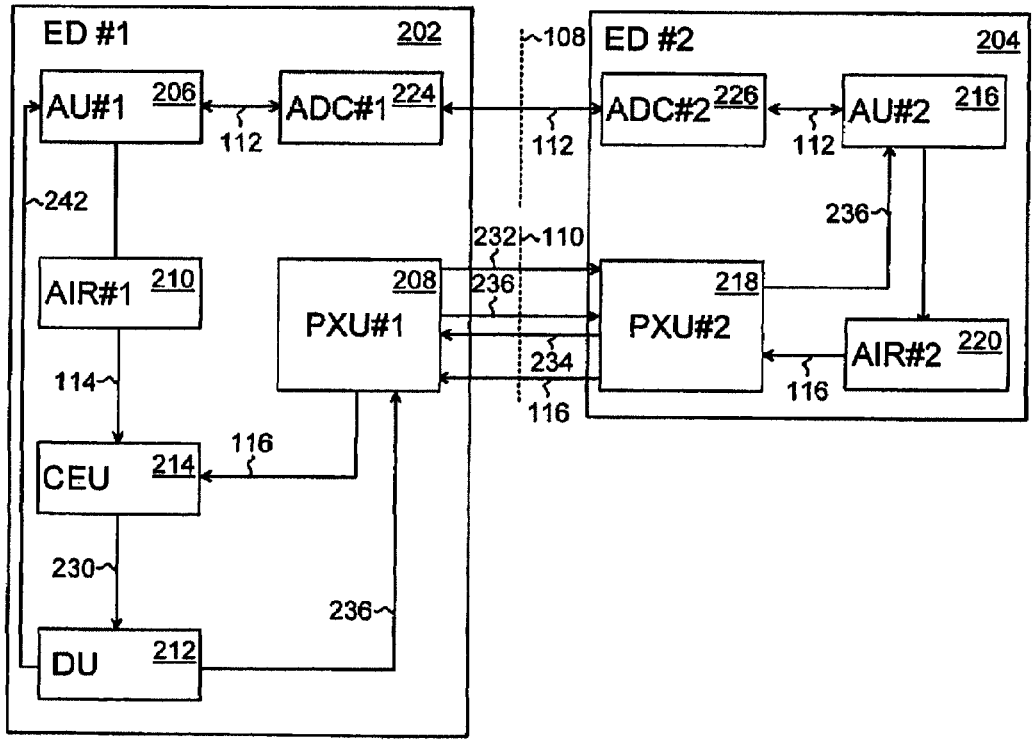
FIG. 2 shows a second example of a system of electric devices.

With reference to FIG. 2, the first electric device 202 includes an application unit (AU#1) 206 for executing commands associated with the first user application 104 of the first electric device 202. The application unit 206 may be implemented with a computer and software of the electric device 202. For example, game applications may be run in the application unit 206.

The application unit 206 may be connected to an application data communication unit (ADC#1) 224, which provides the wireless interface 108 and communicates the application data 112 with the second electric device 204. The application data communication unit 224 may be implemented with a telecommunications system radio modem, which provides a communication link between the first electric device 202 and the network infrastructure of the wireless telecommunications system. In an embodiment of the invention, the application data communication unit 224 implements the wireless proximity interface 110. The application data communication unit 224 may input the application data 112 to the application unit 206 and receive the application data 112 outputted by the application unit 206.

The first electric device 202 further includes a proximity communication unit (PXU#1) 208 for providing the proximity interface 110 between the first electric device 202 and the second electric device 204. The proximity communication unit 208 may include a radio modem for implementing, for example, a Bluetooth radio interface or an RFID interface. The technology to provide such a wireless proximity interface is known to one skilled in the art, and only details relevant to the present solution are referred to. It should be noted that the application communication unit 224 and the wireless proximity communication unit 208 may share resources, such as radio transmitters, memory, and processing power. In an embodiment of the invention, the application communication unit 224 is included in the proximity communication unit 208.

In an embodiment of the invention, the proximity communication unit 208 requests a wireless proximity connection from a plurality of electric devices. The wireless proximity connection may scan the frequency range supported by the wireless proximity interface and transmit a wireless proximity connection request 232 to the second electric device 204.

A positive acknowledgement of the request may be generated in an electric device, which has received a wireless proximity connection request 232. The proximity communication unit 208 may receive a positive acknowledgement message 234, and a procedure to establish the wireless proximity connection may be carried out on the basis of the positive acknowledgement message 234.

In an embodiment of the invention, the communication of the at least one portion of the second set of information 116 from the second electric device 204 to the first electric device 202 is triggered on the basis of the positive acknowledgement. The first electric device 202 may, for example, indicate the second electric device 204 about the preparedness of receiving the second set of information 116.

The wireless proximity communication unit 208 receives at least one portion of the second set of information 116 from the second electric device 204 over the wireless proximity interface 110 and delivers the second set of information 116 to a correspondence evaluating unit (CEU) 214.

The first electric device 202 includes an application information register (AIR#1) 210 connected to the application unit 206. The application information register 210 includes the first set of information 114 of the first electric device 202. The application information register 210 may be implemented with a memory device, for example.

The application information register 210 may be provided with parameters, such as readiness parameters and parameters characterizing user settings of the applications from the application unit 206. In an embodiment of the invention, the application information register 210 is connected to the user interface of the first electric device 202 so that the user actions related to usage of the user applications and the menu items, for example, may be registered.

The first set of information 114 is inputted from the application information register 210 to the correspondence evaluating unit 214. Furthermore, the second set of information 116 is inputted from the proximity communication unit 208 to the correspondence evaluating unit 214.

The correspondence evaluating unit 214 evaluates the correspondence indicator value 230 and outputs the correspondence indicator value 230 to a decision unit (DU) 212 connected to the correspondence evaluating unit 214.

On the basis of the correspondence indicator value 230, the decision unit 212 decides whether or not to execute the at least one command.

In an embodiment of the invention, the decision unit 212 compares the correspondence indicator value 230 with a correspondence indicator threshold value. The correspondence indicator threshold value may be defined by the user or it may have been programmed into the memory of the first electric device 202 by a manufacturer or an operator. If the correspondence indicator value 230 exceeds the correspondence indicator threshold value, the decision unit generates instructions 236, 242 to execute the at least one command associated with the second user application 104 and the first user application 106.

In an embodiment of the invention, the decision unit [232] *212* inputs the instructions 236 to the proximity communication unit 208, which transmits the instructions 236 to the second electric device 204. The second electric device 204 may execute the at least one command on the basis of the instructions 236.

In an embodiment of the invention, the decision unit 212 is connected to the application unit 206 and inputs the instructions 242 to the application unit 206. The application unit 206 executes the at least one command on the basis of the instructions 242.

The correspondence indicator value 230 may be used to determine details of the at least one command. For example, a high value of the correspondence indicator indicates a high level of correspondence between the user preferences and the technical requirements of the electric devices 202, 204, and the command associated with the first user application 104 and the second user application 106 may replace a series of actions otherwise performed by the users. For example, if the electric devices 202, 204 are technically identical, the user applications 104, 106 are identical, and furthermore, the usage history of the electric devices 202, 204 indicating a strong desire to participate in an interactive session, the command may start the user applications automatically. If the correspondence indicator is lower, some user actions, such as confirmation of the start of the user application, may be required.

The correspondence evaluating unit 214 may be implemented with the computer of the first electric device 202 and software.

The decision unit 212 may be implemented with the computer of the first electric device 202 and software.

With further reference to FIG. 2, an aspect the invention provides the second electric device 204.

The second electric device 204 includes an application unit (AU#2) 216, a proximity communication unit (PXU#2) 218, an application information register (AIR#2) 220, and an application data communication unit (ADC#2) 226.

The application unit 216 executes commands associated with the second user application 106 of the second electric device 204. The application unit 216 may be implemented with a computer and software of the second electric device 204. For example, game applications may be run in the application unit 216.

The application unit 216 may be connected to the application data communication unit 224, which provides the wireless interface 108 and communicates the application data 112 with the first electric device 202. The application data communication unit 226 may be implemented with a telecommunications system radio modem, which provides a communication link between the second electric device 204 and the network infrastructure of the wireless telecommunications system. In an embodiment of the invention, the application data communication unit 226 implements the wireless proximity interface 110. The application data communication unit 226 may input the application data 112 to the application unit 216.

The proximity communication unit 218 provides the proximity interface 110 between the first electric device 202 and the second electric device 204. The proximity communication unit 218 may include a radio modem for implementing, for example, a Bluetooth radio interface or an RFID interface. The technology to provide such a wireless proximity interface is known to one skilled in the art, and only details relevant to the present solution are referred to. It should be noted that the application communication unit 226 and the wireless proximity communication unit 218 may share resources, such as radio transmitters, memory, and processing power. In an embodiment of the invention, the application communication unit 226 is included in the proximity communication unit 218.

The application information register 220 includes the second set of information 116 of the second electric device 204. The application information register 220 may be implemented with a memory device, for example.

The application information register 210 may be provided with parameters, such as readiness parameters and parameters characterizing user settings of the applications from the application unit 216. In an embodiment of the invention, the application information register 220 is connected to the user interface of the second electric device 204 so that the user actions related to the usage of the user applications and the menu items, for example, may be registered.

The application information register 220 is connected to the proximity communication unit 218 and inputs the second set of information 216 to the proximity communication unit 218. The proximity communication unit 218 transmits at least one portion of the second set of information 116 to the first electric device 202.

The proximity communication unit 218 receives the instructions 236 to execute at least one command, the at least one command being associated with the second user application 106. The instructions 236 are delivered to the application unit 216, which executes the at least one command on the basis of the instructions 236.

In an embodiment of the invention, the proximity communication unit 218 receives a wireless proximity connection request 232. The proximity communication unit 218 may generate a positive acknowledgement of the request and trigger the communication of the second set of information 116 to the first electric device 202 on the basis of the positive acknowledgement. The proximity communication unit 218 may further transmit a positive acknowledgement message 234 to the first electric device 202 in order to confirm that the wireless proximity connection may be established.

Figure 3:
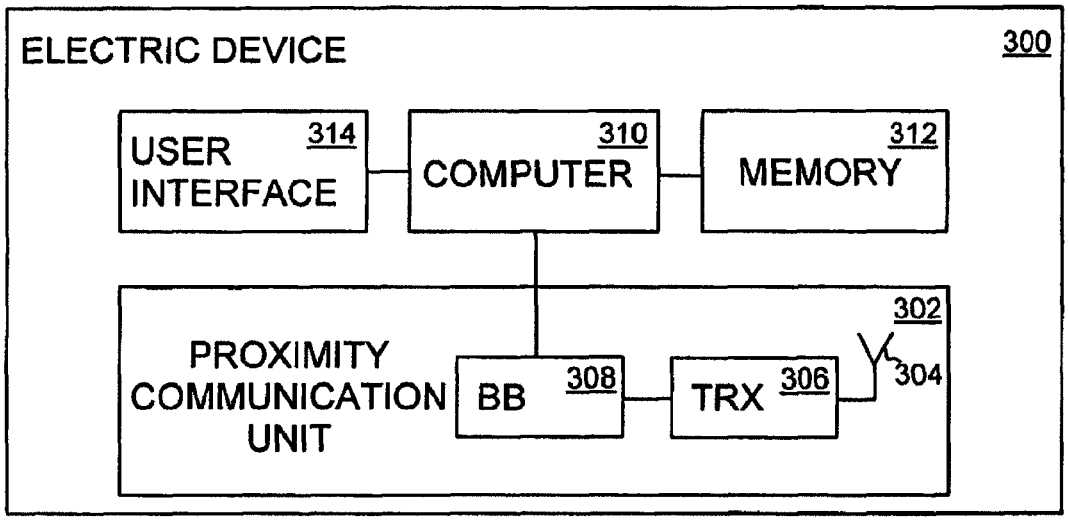
FIG. 3 shows an example of an electric device.

With reference to FIG. 3, an electric device 300 may include a computer 310, a memory unit 312, a user interface 314, and a proximity communication unit 302.

An application unit 206, 216, a correspondence evaluating unit 214 and a decision unit 212 may be implemented in the computer 310 by using software stored in the memory unit 312. An application information register 210, 220 may be implemented in the memory unit 312. The input/output traffic of the application information register 210, 220 may be routed via the computer.

The proximity communication unit 302 typically includes an antenna 304, a transceiver 306 and a base band unit 308. The base band unit 308 may be connected to the computer 310 in order to enable signals, such as those associated with the instructions 236 and the second set of information 116 to be exchanged.

Figure 4:
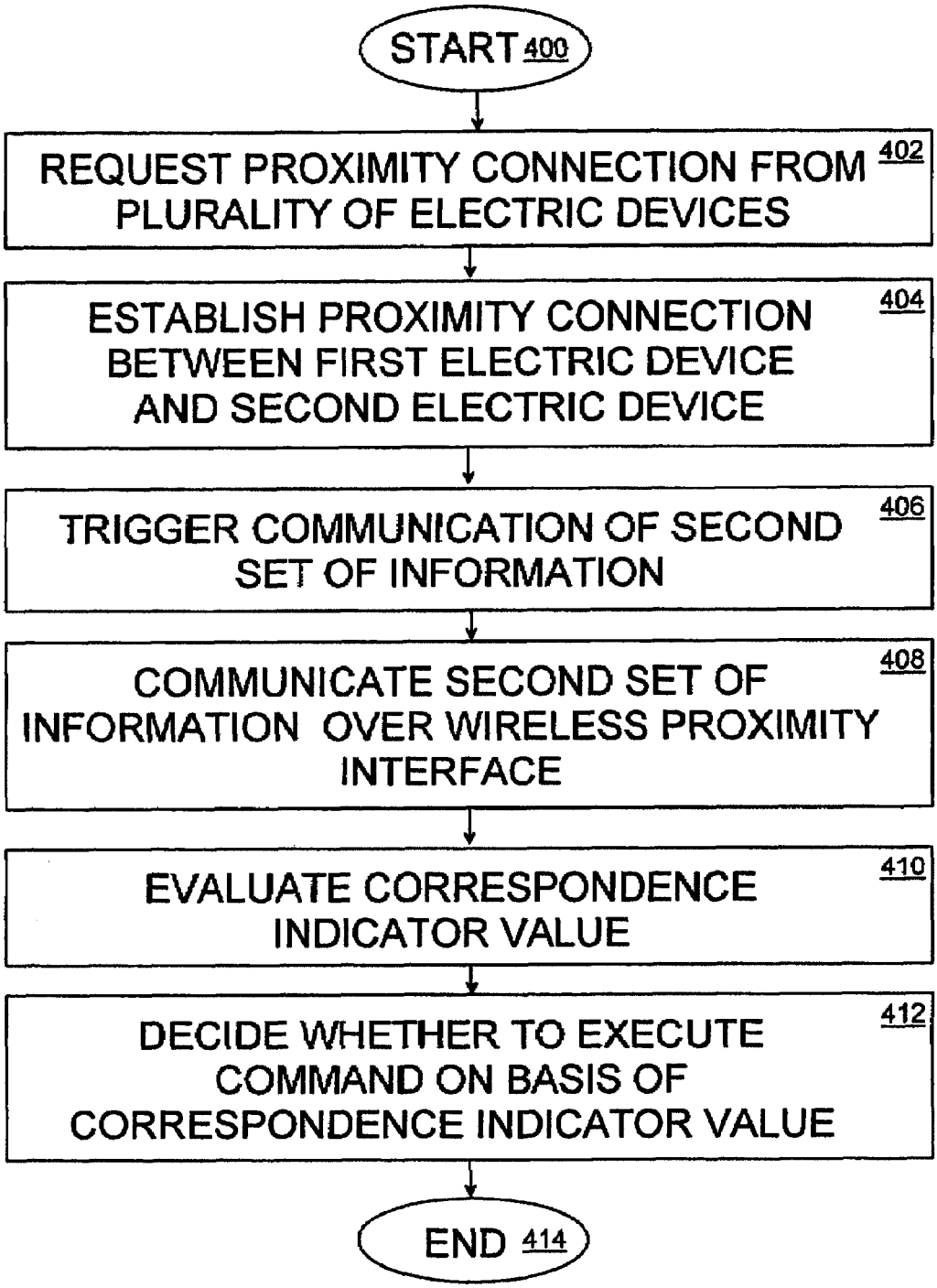
FIG. 4 illustrates a first example of a methodology according to embodiments of the invention.
Figure 5:
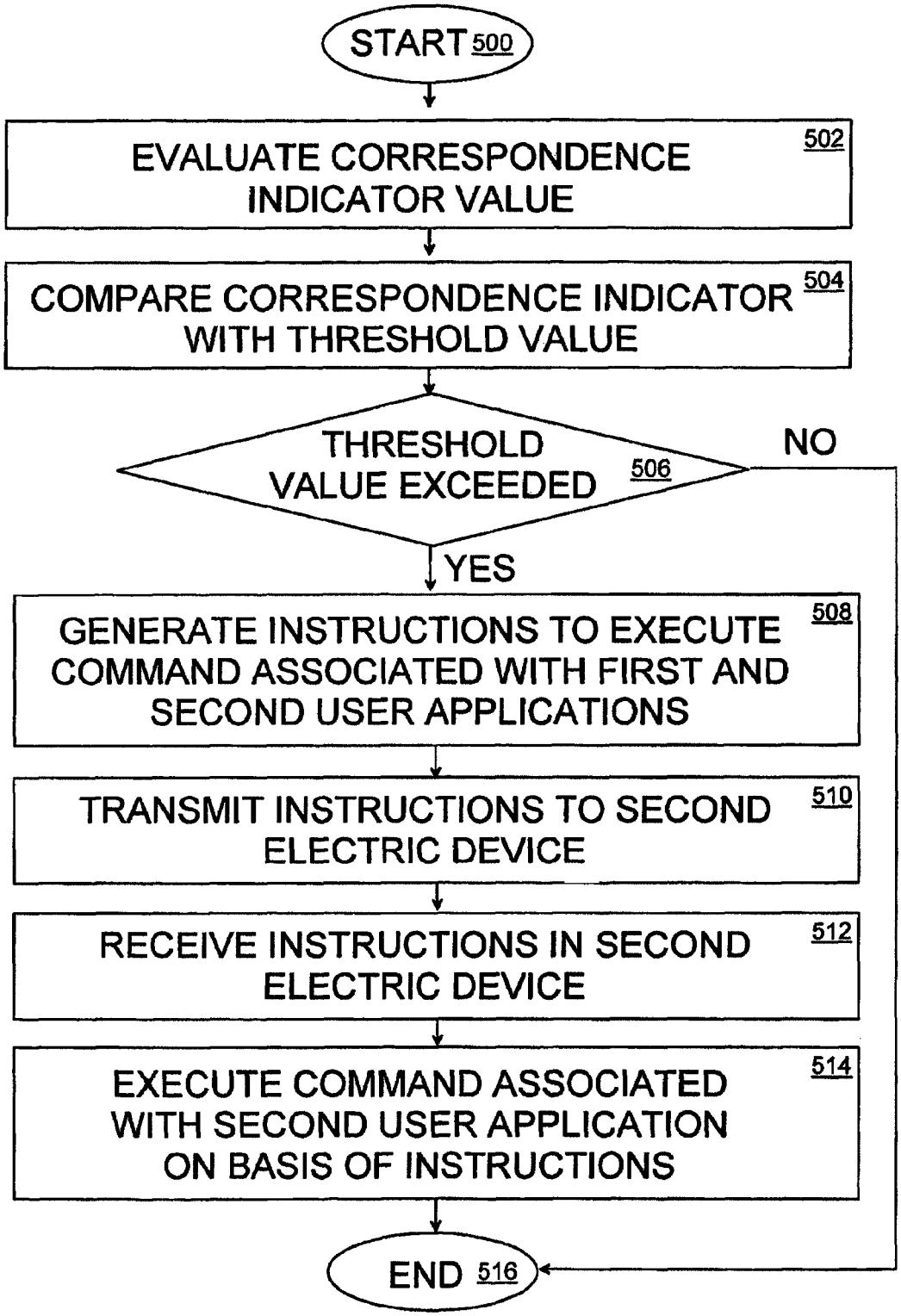
FIG. 5 illustrates a second example of a methodology according to embodiments of the invention.

With reference to FIGS. 4 and 5, a methodology according to embodiments of the invention is illustrated with flow charts.

In FIG. 4, the method starts in 400.

In 402, a wireless proximity connection is requested from a plurality of electric devices.

In 404, the wireless proximity connection is established between a first electric device and a second electric device 204 on the basis of a positive acknowledgement of a wireless proximity connection request 234.

In 406, communication of a second set of information from the second electric device to the first electric device is triggered on the basis of the positive acknowledgement.

In 408, at least one portion of the second set of information 116 is communicated from the second electric device 204 to the first electric device 202 over a wireless proximity interface 108, the second set of information 116 being associated with a second user application 106 of the second electric device 204.

In 410, a correspondence indicator value 230 is evaluated on the basis of at least one portion of a first set of information 114 and the at least one portion of the second set of information 116.

In 412, on the basis of the correspondence indicator value 230 it is decided whether to execute the at least one command.

In 414, the method ends.

In FIG. 5, the method starts in 500.

In 502, a correspondence indicator value 230 is evaluated on the basis of at least one portion of the first set of information 114 and the at least one portion of the second set of information 116.

In 504, the correspondence indicator value 230 is compared with a correspondence indicator threshold value.

In 506, the method divides into two cases. If the correspondence indicator value 230 does not exceed the correspondence indicator threshold value, the method ends.

If the correspondence indicator value 230 exceeds the correspondence indicator threshold value, instructions 236 to execute the at least one command associated with the first user application 104 and the second user application 106 are generated in 508.

In 510, the instructions 236 to execute the at least one command associated with the first user application 114 and the second user application 116 are transmitted from the first electric device 202 to the second electric device 204 over the wireless interface 108, the instructions 236 being based on a comparison between the correspondence indicator value 230 and a correspondence indicator threshold value.

In 512, the instructions 236 are received in the second electric device 204.

In 514, the least one command associated with the second user application 106 is executed on the basis of the instructions 236.

In 516, the method ends.

In an aspect, the invention provides a computer program for executing a: computer process, of which embodiments are shown and described in conjunction with FIGS. 4 and 5. The computer program may be stored in the memory unit 312 and executed in the computer 310.

The computer program may be embodied on a computer readable medium, such as a CD (Compact Disc), a hard drive, a diskette, and a portable memory unit. The computer program may further be transferred with an electric signal in a data network, such as the Internet.

Even though the invention has been described above with reference to an example according to the accompanying drawings, it is clear that the invention is not restricted thereto but it can be modified in several ways within the scope of the appended claims.

The invention claimed is:

1. A method of setting up user applications in a plurality of electric devices, the method including:

communicating at least a portion of a second set of information from a second electric device to a first electric device over a wireless proximity interface, the second set of information being associated with a second user application of the second electric device;

evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding, on the basis of the correspondence indicator value, whether to execute the atleast one command, wherein the at least one command is used to replace a series of actions of the user.

2. The method of claim 1, further including:

requesting a wireless proximity connection from a plurality of electric devices;

establishing the wireless proximity connection between the first electric device and the second electric device on the basis of a positive acknowledgement of a wireless proximity connection request; and triggering communication of the second set of information from the second electric device to the first electric device on the basis of the positive acknowledgement.

3. The method of claim 1, further including:

comparing the correspondence indicator value with a correspondence indicator threshold value; and generating instructions to execute the at least one command associated with the first user application and the second user application if the correspondence indicator value exceeds the correspondence indicator threshold value.

4. The method of claim 1, further including:

transmitting instructions to execute the at least one command associated with the first user application and the second user application from the first electric device to the second electric device over the wireless interface, the instructions being based on a comparison between the correspondence indicator value and a correspondence indicator threshold value;

receiving the instructions in the second electric device; and executing at least one command associated with the second user application on the basis of the instructions.

5. An electric device including:

an application unit for executing commands associated with a first user application of the electric device, the first user application using shared application data communicated between the electric device and another electric device by using a wireless interface, the application data being shared with a second user application of the other electric device;

a proximity communication unit for providing a proximity interface between the electric device and the other electric device;

an application information register connected to the application unit, for storing a first set of information, the first set of information being associated with the first user application;

wherein the proximity communication unit is configured to receive at least a portion of a second set of information from the other electric device over the wireless proximity interface, the second set of information being associated with the second user application;

a correspondence evaluating unit connected to the proximity communication unit and the application information register, for evaluating a correspondence indicator value on the basis of at least a portion of the first set of information and the at least a portion of the second set of information, the correspondence indicator value characterizing the readiness of the electric device and the other electric device to execute at least one command associated with the first user application and the second user application; and a decision unit connected to the correspondence evaluating unit, for deciding, on the basis of the correspondence indicator value, whether to execute the at least one command, wherein the at least one command is used to replace a series of actions of the user.

6. The electric device of claim 5, wherein the proximity communication unit is configured to request a wireless proximity connection from a plurality of electric devices;

wherein the proximity communication unit is configured to establish the wireless proximity connection between the electric device and the other electric device on the basis of a positive acknowledgement of a wireless proximity connection request; and wherein the proximity communication unit is configured to trigger communication of the at least a portion of the second set of information from the other electric device to the electric device on the basis of the positive acknowledgement.

7. The electric device of claim 5, wherein the decision unit is configured to compare the correspondence indicator value with a correspondence indicator threshold value; and wherein the decision unit is configured to generate instructions to execute the at least one command associated with the first user application and the second user application if the correspondence indicator value exceeds the correspondence indicator threshold value.

8. The electric device of claim 5, wherein the proximity communication unit is connected to the decision unit and configured to transmit instructions to execute the at least one command associated *with* the first user application and the second user application from the electric device to the other electric device over the proximity interface, the instructions being based on a comparison between the correspondence indicator value and a correspondence indicator threshold value.

9. The electric device of claim 5, wherein the application unit is connected to the decision unit; and wherein the application unit [in] *is* configured to execute the at least one command associated with the first user application and the second user application on the basis of instructions received from the decision unit.

10. The electric device of claim 5, wherein the proximity communication unit is connected to the application unit; and wherein the proximity interface unit is configured to communicate at least a portion of the application data with the other electric device.

11. An electric device including:

an application unit for executing commands associated with a second user application of the electric device, the second user application using shared application data communicated between the electric device and another electric device by using a wireless interface, the application data being shared with a first user application of the other electric device;

a proximity communication unit for providing a proximity interface between the electric device and the other electric device;

an application information register connected to the application unit, for storing at least a portion of a second set of information, the second set of information being associated with the second user application, the at least a portion of the second set of information being used to evaluate a correspondence indicator value characterizing the readiness of the electric device and the *other* electric device to execute at least one command associated with the first user application and the second user application;

wherein the proximity communication unit is connected to the application information register and configured to transmit the at least a portion of the second set of information to the other electric device over the wireless proximity interface;

wherein the proximity communication unit is connected to the application unit and configured to receive instructions to execute at least one command from the other electric device over the proximity interface, the at least one command being associated with the second user application;

wherein the application unit is configured to execute the at least one command on the basis of the instructions; and wherein the at least one command is used to replace a series of actions of the user.

12. The electric device of claim 11, wherein the proximity communication unit is configured to receive a wireless proximity connection request;

wherein the proximity communication unit is configured to establish the wireless proximity connection between the electric device and the other electric device based on a positive acknowledgement of a wireless proximity connection request; and wherein the proximity communication unit is configured to trigger a communication of the at least a portion of the second set of information from the electric device to the other electric device on the basis of the positive acknowledgement.

13. The electric device of claim 11, wherein the proximity communication unit is connected to the application unit; and wherein the proximity interface unit is configured to communicate at least a portion of the application data with the other electric device.

14. A computer program embodied on a *non-transitory* computer readable [storage] medium, for executing a computer process in an electric device, the computer process including steps, the steps including:

using, as input, at least a portion of a second set of information communicated from a second electric device to a first electric device over a wireless proximity interface, the second set of information being associated with a second user application of the second electric device;

evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding, on the basis of the correspondence indicator value, whether to execute the at least one command, wherein the at least one command is used to replace a series of actions of the user.

15. The computer program of claim 14, wherein the computer process further includes:

requesting a wireless proximity connection from a plurality of electric devices;

establishing the wireless proximity connection between the first electric device and the second electric device on the basis of a positive acknowledgement of a wireless proximity connection request; and triggering communication of the second set of information from the second electric device to the first electric device on the basis of the positive acknowledgement.

16. The computer program of claim 14, wherein the computer process further includes:

comparing the correspondence indicator value with a correspondence indicator threshold value; and generating instructions to execute the at least one command associated with the first user application and the second user application if the correspondence indicator value exceeds the correspondence indicator threshold value.

17. The computer program of claim 14, wherein the computer process further includes:

outputting instructions to execute the at least one command associated with the first user application and the second user application from the first electric device to the second electric device over the wireless interface, the instructions being based on a comparison between the correspondence indicator value and a correspondence indicator threshold value.

18. The computer program of claim 14, wherein the computer process further includes:

inputting instructions to execute the at least one command associated with the first user application and the second user application, the instructions being based on a comparison between the correspondence indicator value and a correspondence indicator threshold value; and executing the at least one command associated with the first user application and the second user application on the basis of instructions.

19. A computer program embodied on a *non-transitory* computer readable storage medium, for executing a computer process in an electric device, the computer process including steps, the steps including:

inputting instructions to execute at least one command from [the other] *another* electric device over [the ] *a* proximity interface, the at least one command being associated with [the second] *a* user application, the [second] user application using application data shared between the electric device and [another] *the other* electric device, at least a portion of the application data being communicated between the electric device and the [second] *other* electric device by using a wireless interface; and executing the at least one command on the basis of the instructions, wherein the at least one command is used to replace a series of actions of the user *and wherein the at least one command enables interactive operation between the user application of the electric device and a user application of the other electric device*.

20. The computer program of claim 19, wherein the computer process further includes:

[inputting] *receiving, by the electric device,* a wireless proximity *connection* request *from the other electric device*;

establishing [the] *a* wireless proximity connection between the electric device and the other electric device based on a positive acknowledgement of [a] *the* wireless proximity connection request, *the positive acknowledgement provided by the electric device*; and triggering a communication of [the at least a portion of the second] *a* set of information from the electric device to the other electric device on the basis of the positive acknowledgement.

21. A system including a first electric device and a second electric device, the system further including:

communicating means for communicating at least a portion of a second set of information from the second electric device to the first electric device over a wireless proximity interface, the second set of information being associated with a second user application of the second electric device;

evaluating means for evaluating a correspondence indicator value on the basis of at least a portion of a first set of information and the at least a portion of the second set of information, the first set of information being associated with a first user application of the first electric device, the first user application and the second user application using shared application data communicated between the first electric device and the second electric device by using a wireless interface, the correspondence indicator value characterizing the readiness of the first electric device and the second electric device to execute at least one command associated with the first user application and the second user application; and deciding means for deciding, on the basis of the correspondence indicator value, whether to execute the at least one command, wherein the at least one command is used to replace a series of actions of the user.

22. The system of claim 21, further including:

requesting means for requesting a wireless proximity connection from a plurality of electric devices;

establishing means for establishing the wireless proximity connection between the first electric device and the second electric device on the basis of a positive acknowledgement of a wireless proximity connection request; and triggering means for triggering communication of the second set of information from the second electric device to the first electric device on the basis of the positive acknowledgement.

23. The system of claim 21, further including:

comparing means for comparing the correspondence indicator value with a correspondence indicator threshold value; and generating means for generating instructions to execute the at least one command associated with the first user application and the second user application if the correspondence indicator value exceeds the correspondence indicator threshold value.

24. The system of claim 21, further including:

transmitting means for transmitting instructions to execute the at least one command associated with the first user application and the second user application from the first electric device to the second electric device over the wireless interface, the instructions being based on a comparison between the correspondence indicator value and a correspondence indicator threshold value;

receiving means for receiving the instructions in the second electric device; and executing means for executing at least one command associated with the second user application on the basis of the instructions.

*25. A method of setting up user applications in a plurality of electric devices, the method comprising:*

*receiving at least a portion of a second set of information from a second electric device at a first electric device over a first wireless interface, the second set of information being associated with a second user application of the second electric device;*

*evaluating a correspondence indicator value on the basis of at least a portion of a first set of information and the at least a portion of the second set of information, the first set of information being associated with a first user application of the first electric device, the correspondence indicator value characterizing the readiness of the first electric device and the second electric device to execute at least one command associated with the first user application and the second user application; and*

*determining, on the basis of the correspondence indicator value, whether to execute the at least one command,*

*wherein the at least one command is used to replace a series of actions of the user.*

*26. The method of claim 25, further comprising:*

*requesting a wireless proximity connection from a plurality of electric devices;*

*establishing the wireless proximity connection between the first electric device and the second electric device on the basis of a positive acknowledgement of a wireless proximity connection request; and*

*causing initiation of communication of the second set of information from the second electric device to the first electric device on the basis of the positive acknowledgement.*

*27. The method of claim 25, further comprising:*

*comparing the correspondence indicator value with a correspondence indicator threshold value; and*

*generating instructions to execute the at least one command associated with the first user application and the second user application if the correspondence indicator value exceeds the correspondence indicator threshold value.*

*28. The method of claim 25, further comprising:*

*transmitting instructions to execute the at least one command associated with the first user application and the second user application from the first electric device to the second electric device over the first wireless interface, the instructions being based on a comparison between the correspondence indicator value and a correspondence indicator threshold value.*

*29. The method of claim 28, further comprising:*

*receiving the instructions at the second electric device; and*

*executing at least one command associated with the second user application on the basis of the instructions.*

*30. The method of claim 25, wherein the first user application and the second user application use shared application data communicated between the first electric device and the second electric device by using a second wireless interface.*

*31. The method of claim 30, wherein the first and second wireless interfaces are the same.*

*32. The method of claim 30, wherein a frequency range associated with the first wireless interface differs from a frequency range associated with the second wireless interface.*

*33. An electric device including:*

*an application unit for executing commands associated with a first user application of the electric device,*

*a proximity communication unit for providing a first interface between the electric device and another electric device;*

*an application information register, connected to the application unit, for storing a first set of information, the first set of information being associated with the first user application;*

*wherein the proximity communication unit is configured to receive at least a portion of a second set of information from the other electric device over the first interface, the second set of information being associated with the second user application;*

*a correspondence evaluating unit, connected to the proximity communication unit and the application information register, for evaluating a correspondence indicator value on the basis of at least a portion of the first set of information and the at least a portion of the second set of information, the correspondence indicator value characterizing the readiness of the electric device and the other electric device to execute at least one command associated with the first user application and the second user application; and*

*a decision unit connected to the correspondence evaluating unit, for determining, on the basis of the correspondence indicator value, whether to execute the at least one command,*

*wherein the at least one command is used to replace a series of actions of the user.*

*34. The electric device of claim 33, wherein the proximity communication unit is configured to request a wireless proximity connection from a plurality of electric devices;*

*wherein the proximity communication unit is configured to establish the wireless proximity connection between the electric device and the other electric device on the basis of a positive acknowledgement of a wireless proximity connection request; and*

*wherein the proximity communication unit is configured to cause initiation of a communication of the at least a portion of the second set of information from the other electric device to the electric device on the basis of the positive acknowledgement.*

*35. The electric device of claim 33, wherein the decision unit is configured to compare the correspondence indicator value with a correspondence indicator threshold value; and*

*wherein the decision unit is configured to generate instructions to execute the at least one command associated with the first user application and the second user application if the correspondence indicator value exceeds the correspondence indicator threshold value.*

*36. The electric device of claim 33, wherein the proximity communication unit is connected to the decision unit and configured to transmit instructions to execute the at least one command associated the first user application and the second user application from the electric device to the other electric device over the first interface, the instructions being based on a comparison between the correspondence indicator value and a correspondence indicator threshold value.*

*37. The electric device of claim 33, wherein the application unit is connected to the decision unit; and*

*wherein the application unit is configured to execute the at least one command associated with the first user application and the second user application on the basis of instructions received from the decision unit.*

*38. The electric device of claim 33, wherein the proximity communication unit is connected to the application unit; and*

*wherein the proximity interface unit is configured to communicate at least a portion of the application data with the other electric device.*

*39. The electric device of claim 33, wherein the first user application uses shared application data communicated between the electric device and the other electric device by using a second interface, the application data being shared with a second user application of the other electric device.*

*40. The electric device of claim 39, wherein the first and second interfaces are the same.*

*41. The electric device of claim 39, wherein a frequency range associated with the first interface differs from a frequency range associated with the second interface.*

*42. An electric device comprising:*

*an application unit for executing commands associated with a second user application of the electric device;*

*a proximity communication unit for providing a first interface between the electric device and another electric device;*

*an application information register connected to the application unit, for storing at least a portion of a second set of information, the second set of information being associated with the second user application, the at least a portion of the second set of information being used to evaluate a correspondence indicator value characterizing the readiness of the electric device and the electric device to execute at least one command associated with the first user application and the second user application;*

*wherein the proximity communication unit is connected to the application information register and configured to transmit the at least a portion of the second set of information to the other electric device over the first interface;*

*wherein the proximity communication unit is connected to the application unit and configured to receive instructions to execute at least one command from the other electric device over the first interface, the at least one command being associated with the second user application;*

*wherein the application unit is configured to execute the at least one command on the basis of the instructions; and*

*wherein the at least one command is used to replace a series of actions of the user.*

*43. The electric device of claim 42, wherein the proximity communication unit is configured to receive a wireless proximity connection request;*

*wherein the proximity communication unit is configured to establish the wireless proximity connection between the electric device and the other electric device based on a positive acknowledgement of a wireless proximity connection request; and*

*wherein the proximity communication unit is configured to cause initiation of a communication of the at least a portion of the second set of information from the electric device to the other electric device on the basis of the positive acknowledgement.*

*44. The electric device of claim 42, wherein the proximity communication unit is connected to the application unit; and*

*wherein the proximity interface unit is configured to communicate at least a portion of the application data with the other electric device.*

*45. The electric device of claim 42, wherein the second user application using shared application data communicated between the electric device and the other electric device by using a second interface, the application data being shared with a first user application of the other electric device.*

*46. The electric device of claim 45, wherein the first and second interfaces are the same.*

*47. The electric device of claim 45, wherein a frequency range associated with the first interface differs from a frequency range associated with the second interface.*

*48. A computer program embodied on a non-transitory computer readable medium, for executing a computer process in an electric device, the computer process including steps, the steps comprising:*

*receiving at least a portion of a second set of information communicated from a second electric device to a first electric device over a first wireless interface, the second set of information being associated with a second user application of the second electric device;*

*evaluating a correspondence indicator value on the basis of at least a portion of a first set of information and the at least a portion of the second set of information, the first set of information being associated with a first user application of the first electric device, the correspondence indicator value characterizing the readiness of the first electric device and the second electric device to execute at least one command associated with the first user application and the second user application; and*

*determining, on the basis of the correspondence indicator value, whether to execute the at least one command, wherein the at least one command is used to replace a series of actions of the user.*

*49. The computer program of claim 48, wherein the computer process further comprises:*

*requesting a wireless proximity connection from a plurality of electric devices;*

*establishing the wireless proximity connection between the first electric device and the second electric device on the basis of a positive acknowledgement of a wireless proximity connection request; and*

*causing initiation of a communication of the second set of information from the second electric device to the first electric device on the basis of the positive acknowledgement.*

*50. The computer program of claim 48, wherein the computer process further comprises:*

*comparing the correspondence indicator value with a correspondence indicator threshold value; and*

*generating instructions to execute the at least one command associated with the first user application and the second user application if the correspondence indicator value exceeds the correspondence indicator threshold value.*

*51. The computer program of claim 48, wherein the computer process further comprises:*

*transmitting instructions to execute the at least one command associated with the first user application and the second user application from the first electric device to the second electric device over the first interface, the instructions being based on a comparison between the correspondence indicator value and a correspondence indicator threshold value.*

*52. The computer program of claim 48, wherein the computer process further comprises:*

*generating instructions to execute the at least one command associated with the first user application and the second user application, the instructions being based on a comparison between the correspondence indicator value and a correspondence indicator threshold value; and*

*executing the at least one command associated with the first user application and the second user application on the basis of the instructions.*

*53. The computer program of claim 48, wherein the first user application and the second user application use shared application data communicated between the first electric device and the second electric device by using a second wireless interface.*

*54. The computer program of claim 53, wherein the first and second wireless interfaces are the same.*

*55. The computer program of claim 53, wherein a frequency range associated with the first wireless interface differs from a frequency range associated with the second wireless interface.*

*56. A computer program embodied on a non-transitory computer readable medium, for executing a computer process in a first electric device, the computer process including steps, the steps comprising:*

*receiving instructions to execute at least one command from a second electric device over a first wireless interface, the at least one command being associated with a user application of the first electric device, the user application using application data shared between the first electric device and the second electric device, at least a portion of the application data being communicated between the first electric device and the second electric device by using a second wireless interface; and*

*executing the at least one command on the basis of the instructions, wherein the at least one command is used to replace a series of actions of the user and wherein the at least one command enables interactive operation between the user application of the first electric device and a user application of the second electric device.*

*57. A system including a first electric device and a second electric device, the system further comprising:*

*receiving means for receiving at least a portion of a second set of information from the second electric device to the first electric device over a first wireless interface, the second set of information being associated with a second user application of the second electric device;*

*evaluating means for evaluating a correspondence indicator value on the basis of at least a portion of a first set of information and the at least a portion of the second set of information, the first set of information being associated with a first user application of the first electric device, the correspondence indicator value characterizing the readiness of the first electric device and the second electric device to execute at least one command associated with the first user application and the second user application; and*

*determining means for determining, on the basis of the correspondence indicator value, whether to execute the at least one command,*

*wherein the at least one command is used to replace a series of actions of the user.*

*58. The system of claim 57, further comprising:*

*means for requesting a wireless proximity connection from a plurality of electric devices;*

*means for establishing the wireless proximity connection between the first electric device and the second electric device on the basis of a positive acknowledgement of a wireless proximity connection request; and*

*means for causing initiation of communication of the second set of information from the second electric device to the first electric device on the basis of the positive acknowledgement.*

*59. The system of claim 57, further comprising:*

*comparing means the correspondence indicator value with a correspondence indicator threshold value; and*

*generating means instructions to execute the at least one command associated with the first user application and the second user application if the correspondence indicator value exceeds the correspondence indicator threshold value.*

*60. The system of claim 57, further comprising:*

*transmitting means for transmitting instructions to execute the at least one command associated with the first user application and the second user application from the first electric device to the second electric device over the first wireless interface, the instructions being based on a comparison between the correspondence indicator value and a correspondence indicator threshold value.*

*61. The system of claim 60, further comprising:*

*receiving means for receiving the instructions at the second electric device; and*

*executing means for executing at least one command associated with the second user application on the basis of the instructions.*

*62. The system of claim 57, wherein the first user application and the second user application using shared application data communicated between the first electric device and the second electric device by using a second wireless interface.*

*63. The system of claim 62, wherein the first and second wireless interfaces are the same.*

*64. The system of claim 62, wherein a frequency range associated with the first wireless interface differs from a frequency range associated with the second wireless interface.*

*65. A method comprising:*

*receiving instructions, at a first electric device, to execute at least one command from a second electric device over a first wireless interface, the at least one command being associated with a user application of the first electric device, the user application using application data shared between the first electric device and the second electric device, at least a portion of the application data being communicated between the first electric device and the second electric device by using a second wireless interface; and*

*executing the at least one command on the basis of the instructions, wherein the at least one command is used to replace a series of actions of the user of the first electric device.*

*66. A computer program embodied on a non-transitory computer readable medium, for executing a computer process in an electric device, the computer process including steps, the steps including:*

*receiving, by the electric device, a wireless proximity connection request from another electric device;*

*establishing a wireless proximity connection between the electric device and the other electric device based on a positive acknowledgement of the wireless proximity connection request, the positive acknowledgement provided by the electric device;*

*triggering a communication of a set of information from the electric device to the other electric device on the basis of the positive acknowledgement;*

*inputting instructions to execute at least one command from the other electric device over a proximity interface, the at least one command being associated with a user application, the user application using application data shared between the electric device and the other electric device, at least a portion of the application data being*

*communicated between the electric device and the other electric device by using a wireless interface; and*

*executing the at least one command on the basis of the instructions, wherein the at least one command is used to replace a series of actions of the user.*

*67. A computer program embodied on a non-transitory computer readable medium, for executing a computer process in a first electric device, the computer process including steps, the steps comprising:*

*receiving, at the first electric device, a wireless connection request from a second electric device;*

*establishing a wireless connection between the first electric device and the second electric device based on a positive acknowledgement of the wireless connection request, the positive acknowledgement provided by the first electric device;*

*triggering a communication of a set of information from the first electric device to the second electric device on the basis of the positive acknowledgement;*

*receiving instructions to execute at least one command from the second electric device over a first wireless interface, the at least one command being associated with a user application of the first electric device, the user application using application data shared between the first electric device and the second electric device, at least a portion of the application data being communicated between the first electric device and the second electric device by using a second wireless interface; and*

*executing the at least one command on the basis of the instructions, wherein the at least one command is used to replace a series of actions of the user.*

*68. A method comprising:*

*receiving, at a first electric device, a wireless connection request from a second electric device;*

*establishing a wireless connection between the first electric device and the second electric device based on a positive acknowledgement of the wireless connection request, the positive acknowledgement provided by the first electric device;*

*triggering a communication of a set of information from the first electric device to the second electric device on the basis of the positive acknowledgement;*

*receiving instructions, at the first electric device, to execute at least one command from the second electric device over a first wireless interface, the at least one command being associated with a user application of the first electric device, the user application using application data shared between the first electric device and the second electric device, at least a portion of the application data being communicated between the first electric device and the second electric device by using a second wireless interface; and*

*executing the at least one command on the basis of the instructions, wherein the at least one command is used to replace a series of actions of the user.*

* * * * *